United States Patent Office 3,492,561
Patented Jan. 27, 1970

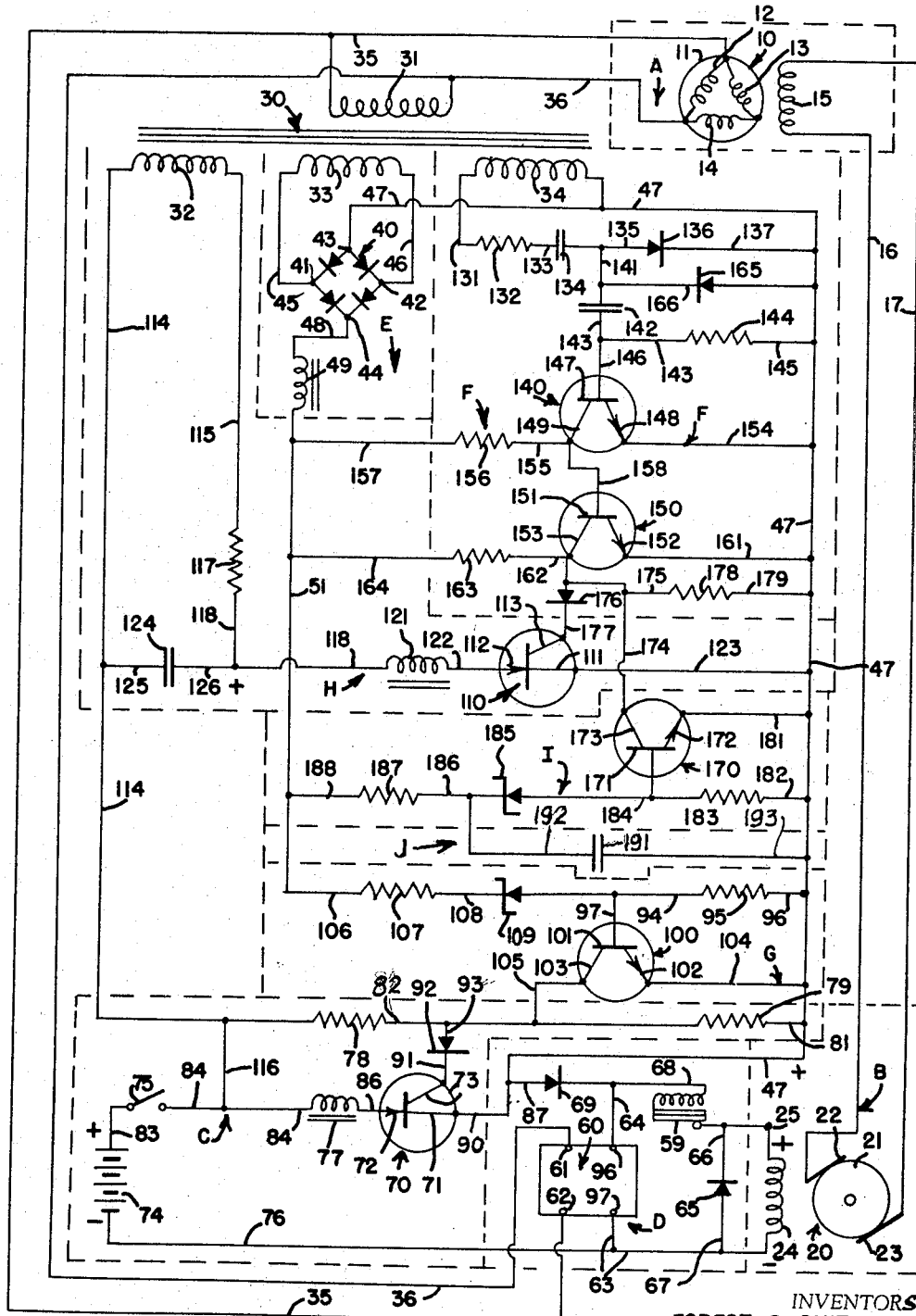

3,492,561
VOLTAGE SUSTAINER FOR MALFUNCTIONING POWER SUPPLIES
Forest D. Smith and David W. Schlicher, Minneapolis, Minn., assignors to Electric Machinery Mfg. Company, Minneapolis, Minn., a corporation of Minnesota
Filed Jan. 23, 1967, Ser. No. 611,098
Int. Cl. H02h 7/06
U.S. Cl. 322—28                    1 Claim

ABSTRACT OF THE DISCLOSURE

A power supply including an output circuit and a field winding circuit, normally energized by a voltage of the output circuit through a voltage regulator. A substitute battery operated sustaining circuit including a silicon controlled rectifier and furnishing voltage to the field winding when the power supply voltage drops below a certain level. A continuously operated gate circuit for the silicon controlled rectifier normally depriving the gate of voltage and maintaining the rectifier in nonconducting condition. Upon deenergisation of the gate circuit the silicon controlled rectifier is triggered and fires, conducting current from the battery to the field winding circuit. A resetting circuit is also employed for removing gate voltage when the power supply voltage reaches normal and a cut off circuit reverses the voltage across the anode cathode elements of the rectifier to shut off the same and opening the sustaining circuit when the power supply voltage is normal.

---

The drawing is a wiring diagram of an alternating power supply illustrating an embodiment of the invention applied thereto.

The invention is utilized with an alternating current power supply A having a generator 10. This generator has a stator 11 provided with 3 phases—12, 13 and 14 which are delta connected. The generator 10 has a field winding 15 which is provided with conductors 16 and 17 connected thereto.

The generator field winding 15 is energized by an exciter B. This exciter includes an armature 21 and brushes 22 and 23 operating with a commutator not shown and connected to the armature winding. The brushes 22 and 23 are connected to conductors 16 and 17 and furnish direct current for exciting the field winding 15 of the generator 10. The exciter 20 also includes an exciter field winding 24.

For supplying current for operating the various circuits of the invention a transformer 30 is employed which has a primary 31 and three secondaries 32, 33 and 34. The primary 31 is connected by means of conductors 35 and 36 to the phase 12 of the generator 10 and supplies single phase alternating current to the transformer.

The secondary 33 forms part of a direct current power supply E for producing direct current for actuation of certain parts of the invention. A full wave rectifier 40 having input terminals 41 and 42 and output terminals 43 and 44 is employed. The input terminals 41 and 42 are connected by means of conductors 45 and 46 to the terminals of the secondary 33 of transformer 30. The output terminals 43 and 44 have connected to them conductors 47 and 48. Conductor 48 is connected to a choke 49 which in turn is connected to a conductor 51. The conductor 51 is of positive potential while conductor 47 is of negative potential.

Regulation of the voltage of generator 10 is procured by means of a voltage regulator circuit D and which is connected to the field winding 24 of the exciter 20. This circuit includes a voltage regulator 60 which is shown in block form. Inasmuch as the particular type of voltage regulator employed forms no particular feature of the invention any type of voltage regulator may be used such as shown in the over voltage control disclosed in the application for patent of over voltage control filed Dec. 27, 1966 by Forest D. Smith and Derrick N. Alcock bearing Ser. No. 604,775, now Patent No. 3,463,998. This voltage regulator has input terminals 61 and 62 and output terminals 96 and 97. The terminals 61 and 62 are directly connected to the conductors 36 and 35 and leading from the output of the generator 10. The terminal 96 is connected by means of a conductor 64 to a diode 69 which in turn is connected by means of a conductor 87 to conductor 47. A thermal overload switch 59 is connected to the conductor 64 and by means of a conductor 68 and by a conductor 25 to field winding 24. Terminal 97 is connected by means of a conductor 63 to the field winding 24 of exciter 20. A diode 65 is connected by means of a conductor 66 to the conductor 25 and by a conductor 67 to a conductor 63 which is also connected to said field winding.

The voltage regulator circuit D is connected to a sustaining circuit C. This circuit includes a silicon controlled rectifier 70 having a cathode 71, an anode 72 and a gate 73. Said circuit also includes a storage battery 74, a manually operated switch 75, a choke 77 and two resistors 78 and 79. The resistor 79 is connected at one end by means of a conductor 81 to conductor 47 and at its other end to the resistor 78 by means of a conductor 82. The battery 74 is connected at one end by means of a conductor 83 to the switch 75. The other end of the said battery is connected to conductor 63 by means of a conductor 76. The switch 75 is connected by a conductor 84 to the choke 77. This choke is connected by a conductor 86 to the anode 72 of the silicon controlled rectifier 70. The cathode 71 of said silicon controlled rectifier is connected by means of a conductor 90 to the conductor 47. The gate of said silicon controlled rectifier is connected by means of a conductor 91 to a diode 92 which in turn is connected by a conductor 93 to the conductor 82.

For controlling the gate circuit of the silicon controlled rectifier 70 a first gate circuit G is employed. This gate circuit includes a transistor 100 which has a base 101, an emitter 102 and a collector 103. The emitter 102 is connected by means of a conductor 104 to the conductor 47 while the collector 103 is connected by a conductor 105 to the conductor 82.

Connected to the conductor 51 by means of a conductor 106 is a resistor 107. This resistor is connected by means of a conductor 108 to a Zener diode 109. Diode 109 is connected by means of a conductor 94 to another resistor 95 which in turn is connected by a conductor 96 to the conductor 47. The base 101 of transistor 100 is connected by means of a conductor 97 to the conductor 94.

For shutting off the silicon controlled rectified 70 a shutoff circuit H is employed. This circuit includes a second silicon controlled rectifier 110 having a cathode 111, an anode 112 and a gate 113. This silicon controlled rectifier is energized from the secondary 32 of transformer 30 and which has connected to it two conductors 114 and 115. The conductor 114 is connected to the resistor 78 while a conductor 116 connects conductor 114 to conductor 84. Conductor 115 is connected to a resistor 117 which in turn is connected by a conductor 118 to a choke 121. Choke 121 is connected by means of a conductor 122 to the anode 112 of silicon controlled rectifier 110. The cathode 111 of said silicon controlled rectifier is connected by means of a conductor 123 to the conductor 47.

A capacitor 124 is connected by conductors 125 and 126 to the conductors 114 and 118 which stores up energy from the secondary 32 of transformer each half cycle.

The pulse circuit F utilizes the secondary winding 34 of transformer 30 which is connected at one end to the conductor 47. The other end of this secondary is connected by a conductor 131 to a resistor 132. This resistor is further connected by means of a conductor 133 to a condenser 134. Condenser 134 is connected by a conductor 135 to a diode 136 which in turn is connected by a conductor 137 to conductor 47. Conductor 135 has connected to it a conductor 141 which in turn is connected to a condenser 142. The condenser 142 is connected by a conductor 143 to a resistor 144 which in turn is connected by a conductor 145 to the conductor 47. The puse circuit F includes an NPN transistor 140 having a base 147, en emitter 148 and a collector 149. The said circuit also includes a second transistor 150. This transistor includes a base 151 an emitter 152 and a collector 153. The base 147 of transistor 140 is connected by means of a conductor 146 to the conductor 143. The emitter of said transistor is connected by a conductor 154 to the conductor 47. The collector 149 is connected by means of a conductor 155 to a resistor 156. This resistor is connected by means of a conductor 157 to the conductor 51. The base 151 of the transistor 150 is connected by means of a conductor 158 to the collector 149 of transistor 140. The emitter 152 of transistor 150 is connected by means of a conductor 161 to conductor 47. The collector of said transistor is connected by means of a conductor 162 to a resistor 163 which in turn is connected by a conductor 164 to the conductor 51.

For controlling the operation of the silicon controlled rectifier a second gate circuit I is employed which utilizes a transistor 170. This transistor has a base 171, an emitter 172 and a collector 173. The collector 173 is connected by means of a conductor 174 to a conductor 175 which in turn is connected to the conductor 162 and the collector 153 of the transistor 150. This conductor is further connected to a diode 176 which in turn is connected by a conductor 177 to the gate 113 of the silicon controlled rectifier 110. Conductor 175 is connected to a resistor 178 which in turn is connected by a conductor 179 to the conductor 47. The emitter 172 of transistor 170 is connected by means of a conductor 181 to the conductor 47. Connected to the conductor 47 by means of a conductor 182 is a resistor 183 which in turn is connected by a conductor 184 to a Zener diode 185 which in turn is connected by a conductor 186 to a resistor 187. This resistor is connected by a conductor 188 to the conductor 51.

The circuit J includes a capacitor 191 which is connected by means of conductors 192 and 193 to conductors 186 and 193. This circuit provides a delay in shorting resistor 95 which removes voltage from the gate 73 before the voltage is removed from cathode 71 of rectifier 70.

The mode of operation of the invention and of the structure disclosed is as follows: Suppose the exciter field 24 is not energized but that both generator and exciter are driven. Neither the exciter nor the generator would be producing current and the entire system would be dead. Upon closing switch 75 a circuit is established including the battery 74, and the voltage divider comprising resistors 78 and 79. This provides voltage for the gate 73 of silicon controlled rectifier 70. The rectifier now conducts through the anode 72 and cathode 71 and energizes the field winding 24 of exciter 20. Exciter 20 now energizes the field winding 15 of generator 10 and the voltage produced by the generator starts to build up.

When the generator voltage reaches a low voltage at which the Zener diode 109 conducts, transistor 100 is actuated and also conducts and a short is produced across resistor 79 thus removing voltage from the gate 73 of silicon controlled rectifier 70.

During each half cycle of the voltage produced by the secondary 32 of transformer 30 energy is being stored in condenser 124 reaching a peak every half cycle.

The pulse circuit F is used for triggering silicon controlled rectifier 110. The diodes 136 and 165, capacitors 134 and 142 and resistor 132 produce a square wave pulse which is impressed on base 147 of transistor 140. This transistor then conducts shorting out the base of transistor 150. The transistor 150 then is pulsed off at the peak of every positive half cycle appearing across capacitor 124. Turning off transistor 150 allows voltage to develop across resistor 178. If the output voltage of transistor 150 is in proper phase relation with the voltage pulses from capacitor 124 voltage is impressed upon the gate 113 of silicon controlled rectifier 110 and this rectifier then conducts. The energy stored in capacitor 124 then discharges through a circuit including conductors 126 and 118, choke 121, conductor 122, the anode 112 and cathode 111 of said rectifier, conductors 123, and 47, the cathode 71 and anode 72 of silicon controlled rectifier 70 and conductors 84, 116, 114 and 125 back to capacitor 124. The polarity of this voltage is reversed as to the polarity of the conducting voltage of said rectifier and the flow of current through this rectifier is eliminated and silicon controlled rectifier shut off. The resistors 132 and 117 are constructed so that the pulses of the square wave in circuit F are in proper phase relation with the pulses produced by condenser 124 so that when silicon controlled rectifier 110 is triggered condenser 124 is sufficiently charged to shut off silicon controlled rectifier 70.

When a short occurs on the line, voltage is removed from the primary of transformer 30. Normally transistor 100 conducts by virtue of current flowing through Zener diode 109. This shunts resistor 79 and prevents triggering of silicon controlled rectifier 70. When however voltage is removed from transistor 100, flow of current through resistor 79 is again established and current flows from the battery through the voltage divider comprising resistors 78 and 79 and triggers silicon controlled rectifier 70 which then conducts current from the battery 74 for energizing the field winding 24 of exciter 20 until such time as voltage is established on transformer 30 when the system shuts off silicon controlled rectifier 70 as previously described and the system operates normally.

The advantages of the invention are manifest. The system is useful in substituting battery voltage for the field winding of an exciter when the generator fails and for disconnecting the battery when the generator voltage reaches a permissible minimum. The system is entirely automatic and under normal operation of the generator uses no battery current.

Changes in the specific form of the invention, as herein described, may be made within the scope of what is claimed without departing from the spirit of the invention.

Having described the invention, what is claimed as new and desired to be protected by Letters Patent is:

1. In an alternating-current power supply having an output circuit and a field-winding circuit energized by the output circuit, the combination of:
 (a) a substitute direct-current sustaining circuit adapted to energize said field winding and including
 (b) a silicon-controlled rectifier having
 (c) normally inactive current conducting means and
 (d) a gate serving as inactive triggering means,
 (e) said current conducting means being conducted in said sustaining circuit and holding said sustaining circuit open when the output voltage is normal and energized from
 (f) a resistor connected in the sustaining circuit,
 (g) a normally inactive triggering circuit responsive to the voltage of the output circuit and including
 (h) a transistor connected to the gate of said silicon controlled rectifier, said transistor, when operated shunts said resistor and produces a voltage at the gate of said silicon controlled rectifier when the output voltage of said power supply becomes normal,
 (i) a second silicon controlled rectifier serving to turn off said first silicon controlled rectifier and actuated by voltage pulses from (j) a capacitor charged by the current from said alternating-current supply and
(k) the gate of said second named silicon controlled rectified is closed by square-wave pulses generated by
(l) a pulsing circuit and shunting
(m) a resistor furnishing voltage to the second named silicon controlled rectifier.

References Cited

UNITED STATES PATENTS 3,249,846   5/1966   Steinbruegge et al. ___ 322—28

ORIS L. RADER, Primary Examiner
H. HUBERFELD, Assistant Examiner

U.S. Cl. X.R.
322—60, 73, 88